US012685305B2

(12) United States Patent
Price

(10) Patent No.: US 12,685,305 B2
(45) Date of Patent: Jul. 21, 2026

(54) EXTENDABLE HUNTING STAND WITH MOVABLE PLATFORM

(71) Applicant: Joseph Albert Price, Chestertown, MD (US)

(72) Inventor: Joseph Albert Price, Chestertown, MD (US)

(73) Assignee: Joseph Albert Price, Chestertown, MD (US)

( * ) Notice: Subject to any disclaimer, the term of this patent is extended or adjusted under 35 U.S.C. 154(b) by 1311 days.

(21) Appl. No.: 17/166,668

(22) Filed: Feb. 3, 2021

(65) Prior Publication Data

US 2022/0240497 A1 Aug. 4, 2022

(51) Int. Cl.
| | |
|---|---|
| *A01M 31/02* | (2006.01) |
| *E06C 5/18* | (2006.01) |
| *E06C 7/12* | (2006.01) |
| *E06C 7/16* | (2006.01) |

(52) U.S. Cl.
CPC .............. *A01M 31/02* (2013.01); *E06C 5/18* (2013.01); *E06C 7/12* (2013.01); *E06C 7/16* (2013.01)

(58) Field of Classification Search
CPC ......... A01M 31/00; A01M 31/02; E06C 5/18; E06C 7/12; E06C 7/16; E06C 7/165; A63B 27/00; A63B 2210/50; B66F 11/04; B66F 11/046; B66F 3/08; B66F 3/10; B66F 3/44; B66F 3/12; B66F 3/14; B66B 7/00; B66B 7/02; B66B 7/026; B66B 7/04; F16M 13/00; F16M 13/02; F16M 13/005

USPC ......................................................... 182/116
See application file for complete search history.

(56) References Cited

U.S. PATENT DOCUMENTS

| | | | | | |
|---|---|---|---|---|---|
| 2,158,949 | A | * | 5/1939 | Sarles ...................... | E06C 1/387 |
| | | | | | 280/166 |
| 2,875,852 | A | * | 3/1959 | Morrell ...................... | B66F 9/08 |
| | | | | | 187/229 |
| 2,946,406 | A | * | 7/1960 | Henry ........................ | B66F 9/04 |
| | | | | | 187/229 |
| 3,061,046 | A | * | 10/1962 | Gunning ................... | B66F 9/08 |
| | | | | | 187/230 |
| 3,232,380 | A | * | 2/1966 | Hansen ..................... | B66F 9/16 |
| | | | | | 414/667 |
| 3,237,719 | A | * | 3/1966 | Russell ..................... | E06C 1/12 |
| | | | | | 182/103 |

(Continued)

OTHER PUBLICATIONS

Hytek Outdoors; HT-1 Mechanical Tree Stand; Accessed on Mar. 1, 2021; https://www.facebook.com/837651319639757/videos/549056699064619/.

*Primary Examiner* — Daniel P Cahn
*Assistant Examiner* — Shiref M Mekhaeil
(74) *Attorney, Agent, or Firm* — Sterne, Kessler, Goldstein & Fox P.L.L.C.

(57) ABSTRACT

An extendable hunting stand includes a post assembly and a platform assembly. The post assembly includes multiple posts, and includes an outer post having an upper end defining an opening, an inner post telescopically arranged within the outer post. The inner post is configured to extend through the opening at the upper end of the outer post. The platform assembly is movable between a lower end and an upper end of the inner post. A lifting assembly automatically moves the platform assembly along the inner post between the lower end and the upper end of the inner post.

15 Claims, 11 Drawing Sheets

(56) References Cited

U.S. PATENT DOCUMENTS

| | | | | |
|---|---|---|---|---|
| 3,337,187 | A * | 8/1967 | Sumner | B66C 23/48 |
| | | | | 254/387 |
| 3,344,885 | A * | 10/1967 | Rasmussen | B66B 9/16 |
| | | | | 280/103 |
| 3,428,145 | A * | 2/1969 | Lyon | E06C 7/16 |
| | | | | 182/103 |
| 3,666,046 | A * | 5/1972 | Meineck, Jr. | E04G 1/18 |
| | | | | 182/69.6 |
| 3,978,990 | A * | 9/1976 | Honea | A01G 23/006 |
| | | | | 294/110.1 |
| 4,184,570 | A * | 1/1980 | Edwards | B66F 9/02 |
| | | | | 187/401 |
| 4,258,825 | A * | 3/1981 | Collins | B66F 11/04 |
| | | | | 180/443 |
| 4,552,403 | A * | 11/1985 | Yindra | A61G 13/02 |
| | | | | 187/209 |
| 4,619,346 | A * | 10/1986 | Deguerry | B66F 11/04 |
| | | | | 187/244 |
| 4,984,657 | A * | 1/1991 | Burns | B66F 7/025 |
| | | | | 187/217 |
| 5,078,364 | A * | 1/1992 | Harrell | B62B 3/0637 |
| | | | | 254/387 |
| 5,143,182 | A * | 9/1992 | Basta | B63C 3/06 |
| | | | | 187/408 |
| 5,271,482 | A * | 12/1993 | Walz | E04G 1/20 |
| | | | | 182/69.6 |
| 5,289,782 | A * | 3/1994 | Rizzi | A47B 9/02 |
| | | | | 248/162.1 |
| 5,425,433 | A * | 6/1995 | Huber | B66F 11/04 |
| | | | | 187/243 |
| 5,425,595 | A * | 6/1995 | Roper | E01F 13/046 |
| | | | | 404/9 |
| 5,516,070 | A * | 5/1996 | Chapman | B62D 21/18 |
| | | | | 396/428 |
| 5,533,593 | A * | 7/1996 | Huang | E06C 1/397 |
| | | | | 182/69.4 |
| 5,636,705 | A * | 6/1997 | St-Germain | E04G 1/20 |
| | | | | 74/89.32 |
| 5,645,142 | A * | 7/1997 | Kraemer | B66F 9/08 |
| | | | | 182/148 |
| 5,799,588 | A * | 9/1998 | Engel | A47B 57/06 |
| | | | | 108/143 |
| 6,234,034 | B1 * | 5/2001 | Ando | F16H 25/2472 |
| | | | | 254/98 |
| 6,234,453 | B1 * | 5/2001 | Block | B66C 23/48 |
| | | | | 254/362 |
| 6,494,005 | B2 * | 12/2002 | Zimmerman | B66F 7/025 |
| | | | | 254/420 |
| 6,640,934 | B1 * | 11/2003 | Edwards | B66B 9/00 |
| | | | | 187/254 |
| 6,659,428 | B2 * | 12/2003 | Kubota | B66F 3/10 |
| | | | | 254/102 |
| 6,676,233 | B1 * | 1/2004 | Evans | B66B 9/02 |
| | | | | 187/401 |
| 6,976,598 | B2 * | 12/2005 | Engel | A47B 57/06 |
| | | | | 211/175 |
| 7,195,216 | B2 * | 3/2007 | Wang | A47G 33/06 |
| | | | | 248/161 |
| 7,281,607 | B1 * | 10/2007 | Kiraly | E06C 7/12 |
| | | | | 182/102 |
| 7,412,931 | B2 * | 8/2008 | Seidl | A47B 9/02 |
| | | | | 108/147 |
| 7,588,232 | B2 * | 9/2009 | Wei | F16H 19/0663 |
| | | | | 212/347 |

| | | | | |
|---|---|---|---|---|
| 7,810,793 | B1 * | 10/2010 | Chiang | B66F 3/10 |
| | | | | 212/348 |
| 7,823,694 | B2 * | 11/2010 | Motes | A01M 31/02 |
| | | | | 182/187 |
| 8,006,803 | B2 * | 8/2011 | Guering | B64C 1/24 |
| | | | | 182/95 |
| 8,033,742 | B1 * | 10/2011 | Chapman | F16M 11/18 |
| | | | | 396/428 |
| 8,316,994 | B1 * | 11/2012 | Rands | B66B 9/187 |
| | | | | 187/244 |
| 8,469,312 | B2 * | 6/2013 | Gorlich | B64C 1/24 |
| | | | | 244/17.11 |
| 8,534,422 | B2 * | 9/2013 | Solhjem | E04G 1/24 |
| | | | | 182/141 |
| 8,752,671 | B1 * | 6/2014 | Holman | E06C 1/381 |
| | | | | 182/189 |
| 8,821,322 | B1 * | 9/2014 | Jorgens | A63B 69/0075 |
| | | | | 473/417 |
| 8,905,354 | B2 * | 12/2014 | Griffiths | B64C 1/24 |
| | | | | 182/89 |
| 9,221,540 | B2 * | 12/2015 | Olive | B64D 9/00 |
| 9,938,734 | B1 * | 4/2018 | Garis | E04G 5/067 |
| 10,334,948 | B2 * | 7/2019 | Xiang | A47B 96/14 |
| 10,400,945 | B2 * | 9/2019 | Panzer | B66F 7/14 |
| 10,597,274 | B1 * | 3/2020 | Busuttil | B66F 11/04 |
| 10,856,652 | B2 * | 12/2020 | Stanek | A47B 21/06 |
| 11,079,063 | B2 * | 8/2021 | Shehab | F16M 11/2014 |
| 11,229,200 | B1 * | 1/2022 | Gardner | A01M 31/02 |
| 11,344,117 | B2 * | 5/2022 | Xiang | A47B 51/00 |
| 11,540,505 | B2 * | 1/2023 | Booth | A01M 31/02 |
| 11,806,582 | B1 * | 11/2023 | Brown | A01M 31/02 |
| 2001/0037751 | A1 * | 11/2001 | Agee | A47B 9/12 |
| | | | | 108/147 |
| 2002/0116881 | A1 * | 8/2002 | Zimmerman | B66F 7/025 |
| | | | | 52/126.6 |
| 2005/0191049 | A1 * | 9/2005 | Chapman | B66F 11/048 |
| | | | | 396/428 |
| 2006/0130714 | A1 * | 6/2006 | Jones | A47B 13/023 |
| | | | | 108/106 |
| 2007/0095611 | A1 * | 5/2007 | Oertwig | A01M 31/02 |
| | | | | 182/142 |
| 2007/0137535 | A1 * | 6/2007 | Jones | A47B 9/02 |
| | | | | 108/147 |
| 2007/0169996 | A1 * | 7/2007 | Blue | A01M 31/02 |
| | | | | 182/141 |
| 2008/0271948 | A1 * | 11/2008 | Motes | A01M 31/02 |
| | | | | 182/141 |
| 2009/0321186 | A1 * | 12/2009 | Louchart | A01M 31/02 |
| | | | | 182/188 |
| 2011/0031203 | A1 * | 2/2011 | Chapman | B66F 11/048 |
| | | | | 212/196 |
| 2014/0054522 | A1 * | 2/2014 | Panzer | B66F 3/10 |
| | | | | 254/98 |
| 2014/0110193 | A1 * | 4/2014 | Conley | B60R 3/02 |
| | | | | 182/91 |
| 2015/0246799 | A1 * | 9/2015 | Mizelmoe | B66F 9/07577 |
| | | | | 182/69.5 |
| 2016/0037907 | A1 * | 2/2016 | Ergun | A47B 9/20 |
| | | | | 248/188.5 |
| 2017/0341924 | A1 * | 11/2017 | DeWitt | B60P 7/0815 |
| 2019/0336828 | A1 * | 11/2019 | Hines | A01M 31/02 |
| 2020/0048056 | A1 * | 2/2020 | Bush | B66F 3/10 |
| 2020/0146278 | A1 * | 5/2020 | Bittner | A01M 31/02 |
| 2020/0344997 | A1 * | 11/2020 | Berkbuegler | A01M 31/02 |
| 2021/0095524 | A1 * | 4/2021 | Petreman | E06C 1/381 |
| 2021/0283467 | A1 * | 9/2021 | Booth | A63B 27/00 |
| 2022/0248662 | A1 * | 8/2022 | Wynalda, Jr. | E06C 1/381 |

* cited by examiner

1

EXTENDABLE HUNTING STAND WITH MOVABLE PLATFORM

FIELD

Embodiments described herein relate to a hunting stand. Specifically, embodiments described herein relate to a hunting stand having a movable platform.

BACKGROUND

Hunters often use hunting stands, also referred to as treestands or deer stands, while hunting deer and other game animals to obtain an elevated vantage point from which the hunter can better view the surrounding area and animals. The hunting stand may include a platform or seat that the hunter can mount to a tree at a desired elevation using harnesses, ropes, or cables. The hunting stand allows the hunter to more easily maintain an elevated position for an extended period of time while hunting animals.

BRIEF SUMMARY OF THE INVENTION

Some embodiments described herein relate to an extendable hunting stand that includes a post assembly including a plurality of posts, wherein the plurality of posts are telescopic such that a height of the post assembly is adjustable in a longitudinal direction. The extendable hunting stand further includes a platform assembly that includes a platform base movably coupled to the post assembly, a platform connected to the platform base and configured to support a hunter, and a lifting assembly for automatically moving the platform assembly along the post assembly between a lower end and an upper end of the post assembly.

In any of the various embodiments described herein, the platform may be pivotably connected to the platform base, such that the platform is configured to rotate from a stowed position in which the platform is parallel to the outer post, and an extended position in which the platform is perpendicular to the outer post.

In any of the various embodiments described herein, the lifting assembly may include a motor.

In any of the various embodiments described herein, the lifting assembly may include a pulley and a cable arranged on the pulley and connected at a first end to the platform assembly and at a second end to a lower end of the post assembly.

In any of the various embodiments described herein, the plurality of posts of the post assembly may include an outer post, and an inner post arranged within the outer post and movable relative to the outer post. In some embodiments, the platform assembly may be movably coupled to the inner post of the post assembly between an upper end and an opposing lower end of the inner post.

In any of the various embodiments described herein, the extendable hunting stand may further include plurality of steps arranged on a post of the post assembly. In some embodiments, each of the plurality of steps comprises a mounting plate secured to the outer post, and a foldable platform.

Some embodiments described herein relate to an extendable hunting stand that includes a post assembly including an outer post having an upper end and a lower end, and an inner post having an upper end and a lower end, wherein the inner post is arranged within the outer post and is movable from a stowed position in which an upper end of the inner post is at or below the upper end of the outer post, and an extended position in which the inner post extends above the upper end of the outer post. The hunting stand further includes a platform assembly including a platform base, a platform connected to the platform base, and a platform arm connected to the platform base and movable along the inner post. The hunting stand further includes a lifting assembly including a pulley arranged at the upper end of the inner post inside of the inner post, a cable extending around the pulley and having a first end connected to the platform arm inside of the inner post and a second end connected to the lower end of the outer post, and a motor configured to drive a threaded rod that extends in a longitudinal direction of the post assembly, wherein the threaded rod is movably connected to the inner post such that rotation of the threaded rod by the motor causes the inner post to move along the threaded rod.

In any of the various embodiments described herein, the motor may be arranged within a motor housing at the lower end of the outer post.

In any of the various embodiments described herein, the hunting stand may further include a wheel assembly arranged at the upper end of the outer post, wherein the wheel assembly comprises one or more wheels configured to contact the inner post. In some embodiments, the upper end of the outer post may include an opening configured to allow the inner post to extend through the opening and above the upper end of the outer post, the one or more wheels of the wheel assembly may be arranged around the opening at the upper end of the outer post, and the one or more wheels may be configured to contact a portion of the inner post extending through the opening.

In any of the various embodiments described herein, the one or more wheels of the wheel assembly may be configured to contact a portion of the inner post within the outer post.

In any of the various embodiments described herein, the inner post may include one or more wheels in contact with an interior surface of the outer post.

In any of the various embodiments described herein, the inner post may include an extension, and the inner post may be movably coupled to the threaded rod via the extension.

In any of the various embodiments described herein, the inner post may include a longitudinal slot extending between the lower end and the upper end of the inner post, and the platform arm may extend through the longitudinal slot.

In any of the various embodiments described herein, the outer post may include a longitudinal opening extending between the lower end and the upper end.

Some embodiments described herein relate to an extendable hunting stand that includes a post assembly including an outer post, and an inner post having a lower end opposite an upper end, wherein the inner post is arranged within the outer post and is movable from a stowed position in which an upper end of the inner post is at or below the upper end of the outer post, and an extended position in which the inner post extends above the upper end of the outer post. The hunting stand further includes a platform assembly movable along the inner post between the lower end and the upper end, and a lifting assembly configured to automatically move the platform assembly along the inner post between the lower end and the upper end. The lifting assembly of the hunting stand may include a pulley fixed to an interior of the upper end of the inner post, and a cable having a first end attached to the platform assembly and a second end attached to a lower end of the outer post, such that an elevation of the platform is adjusted when the inner post is moved relative to the outer post.

In any of the various embodiments described herein, the lifting assembly may further include a motor that drives a threaded rod, and the threaded rod may be movably coupled to the inner post such that rotation of the threaded rod by the motor causes the inner post to move along the threaded rod.

In any of the various embodiments described herein, the cable may be enclosed within the post assembly.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
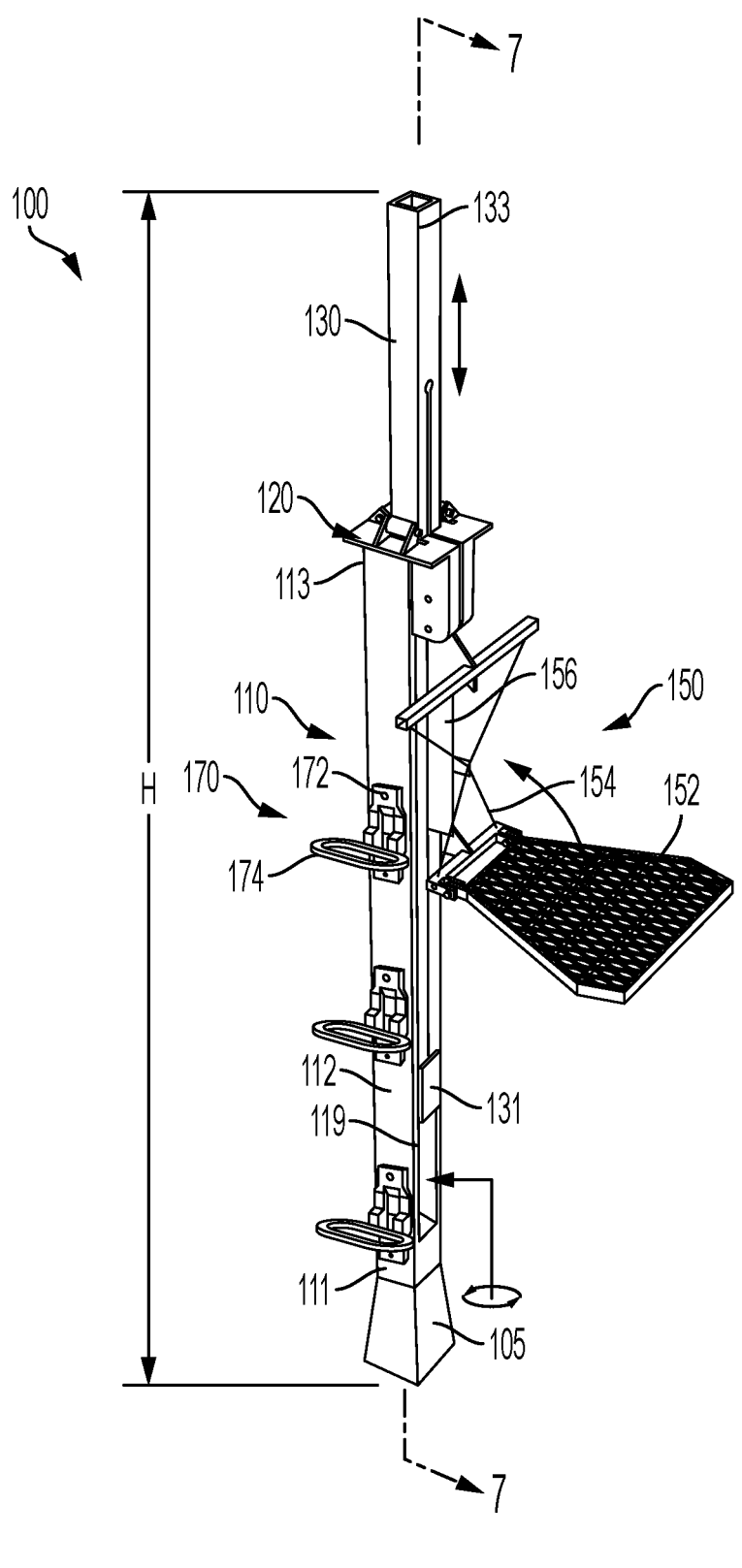
FIG. 1 shows a perspective view of an extendable hunting stand according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

In order to install a hunting stand, a hunter can mount the hunting stand in a tree or in another elevated location. The hunter may need to identify a tree that has the appropriate height and thickness to support a hunting stand and the hunter's weight. For example, a young tree may be too thin to support the stand and the hunter's weight or may be too short and may not provide the desired vantage point for hunting. In some cases, a tree capable of supporting the hunting stand and hunter and may not be in the optimal location for obtaining a clear line of sight, and the hunter may settle for mounting the hunting stand in a tree that provides an obstructed view.

Once a proper tree has been located, hunters generally choose to mount hunting stands at an elevation of 15 feet, 20 feet, or higher in order to obtain the best vantage point, to limit the hunter's visibility to animals, and to hide the hunter's scent from animals. The hunter may climb the tree while carrying the hunting stand, such as by using climbing sticks, harnesses, and other tools. Once the hunter reaches the desired elevation, the hunter may mount the hunting stand using a harness and other securing devices.

Climbing a tree and mounting a hunting stand may be difficult or impractical for elderly hunters or hunters having physical disabilities. As a result, some hunters may be unable to use a hunting stand to obtain an elevated vantage point. This may be detrimental to the hunter's ability to participate in hunting, as the hunter may have less success spotting an animal without detection by the animal and obtaining a clear shot. As a result, the hunter's overall enjoyment of the sport may suffer. Additionally, many able-bodied hunters may find it difficult or unpleasant to climb a tree and mount a hunting stand in an elevated location while carrying their hunting gear. Further, climbing a tree to install a hunting stand presents a risk of injury to the hunter, and the hunter may fall while climbing the tree or may fall if the hunting stand is not properly mounted in the tree.

Some hunting stands may include a ladder to help the hunter reach the hunting stand, however, such stands may be unwieldy to store and transport and may not allow the hunter to select the elevation at which the hunting stand is positioned. Hunters with physical disabilities may be unable to climb a ladder to reach the hunting stand.

Some embodiments described herein relate to a hunting stand that automatically moves a platform to an elevated position above the ground so that a hunter may obtain an elevated vantage point on the platform without having to climb a ladder or a tree. This may be particularly beneficial for hunters having limited mobility or physical handicaps. Additionally, some embodiments described herein relate to a hunting stand that includes components movable from a stowed position to an extended position so that the hunting stand can be arranged in a more compact position for transportation and storage, and can be quickly and easily installed for use. Further, some embodiments described herein relate to a hunting stand having safety features for minimizing the risk of falls.

Figure 2:
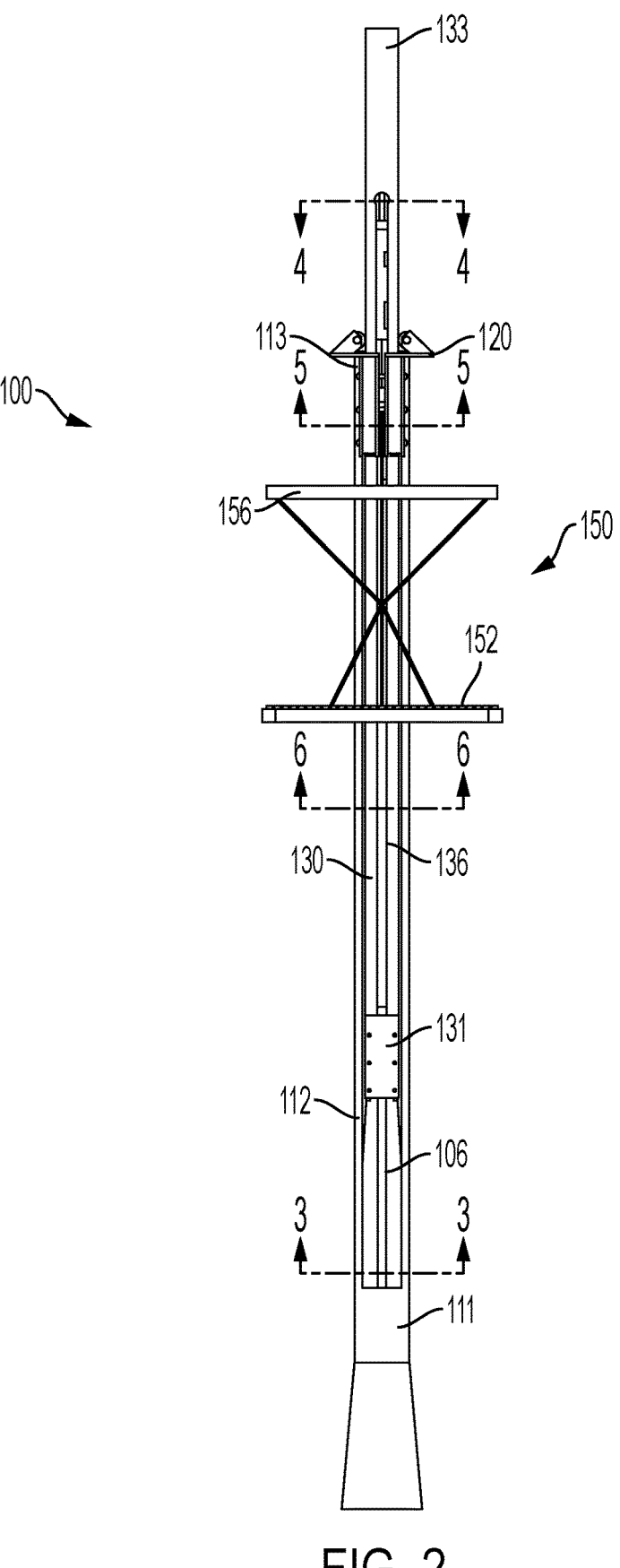
FIG. 2 shows a front view of the extendable hunting stand of FIG. 1.

An extendable hunting stand 100 according to an embodiment is shown in FIGS. 1 and 2. Hunting stand 100 may include a post assembly 110 and a platform assembly 150 movable along post assembly 110. Post assembly 110 may include a plurality of posts telescopically arranged within one another so that the post assembly 110 is adjustable in height in a longitudinal direction of post assembly 110 (e.g., in a direction from lower end 111 to upper end 133 of post assembly 110). In FIG. 1, post assembly 110 includes an outer post 112, and an inner post 130 movably arranged within outer post 112. However, in some embodiments, post assembly 110 may include additional posts, such as an additional inner post arranged within inner post 130 to provide additional height adjustment capabilities.

Platform assembly 150 may be movable along post assembly 110, from a lower end 111 to an upper end 133. In some embodiments, platform assembly 150 may be movable along a length of inner post 130, such as between lower end 131 and upper end 133 of inner post 130, and inner post 130 may be movable relative to outer post 112.

Platform assembly 150 may include a platform 152 connected to a platform base 156. Platform 152 may include a generally planar surface for supporting a hunter. In some embodiments, platform 152 may include a seat, a chair, a stool, a pedestal, a cushion, or the like. Further, in some embodiments, platform 152 may be configured to receive a seat, chair, or wheelchair thereon, and may include brackets, fasteners, or other securing members for securing the same to platform 152. In some embodiments, platform 152 may be connected to platform base 156 via one or more hinges 154. Platform 152 may rotate about hinge 154 from a collapsed position in which platform 152 is generally parallel to post assembly 110, to an extended position in which platform 152 is generally perpendicular to post assembly 110 (see, e.g., FIG. 7). Platform 152 may rotate about hinge 154 by about 90 degrees from the collapsed position to the extended position. In another aspect, platform 152 may be detachable from platform base 156.

As shown in FIG. 1, post assembly 110 includes an outer post 112 having a lower end 111 opposite an upper end 113. Outer post 112 may be generally linear in configuration. Outer post 112 may be generally hollow so that one or more inner posts 130 may be arranged within outer post 112. Outer post 112 is configured to be arranged in a vertical orientation within lower end 111 near ground-level, and upper end 113 arranged above lower end 111. Outer post 112 may have a square or rectangular transverse cross sectional area. However, in some embodiments, outer post 112 may have a circular or elliptical cross sectional area, among other cross sectional shapes. Outer post 112 may include an opening 117 at upper end 113 so that inner post 130 may extend through opening 117 above and beyond upper end 113 of outer post 112. Outer post 112 may include a longitudinal opening 119 extending between lower end 111 and upper end 113 of outer post 112. Inner post 130 may be exposed through longitudinal opening 119 so that platform assembly 150 can be movable along inner post 130 and may extend outwardly from outer post 112.

Figure 6:
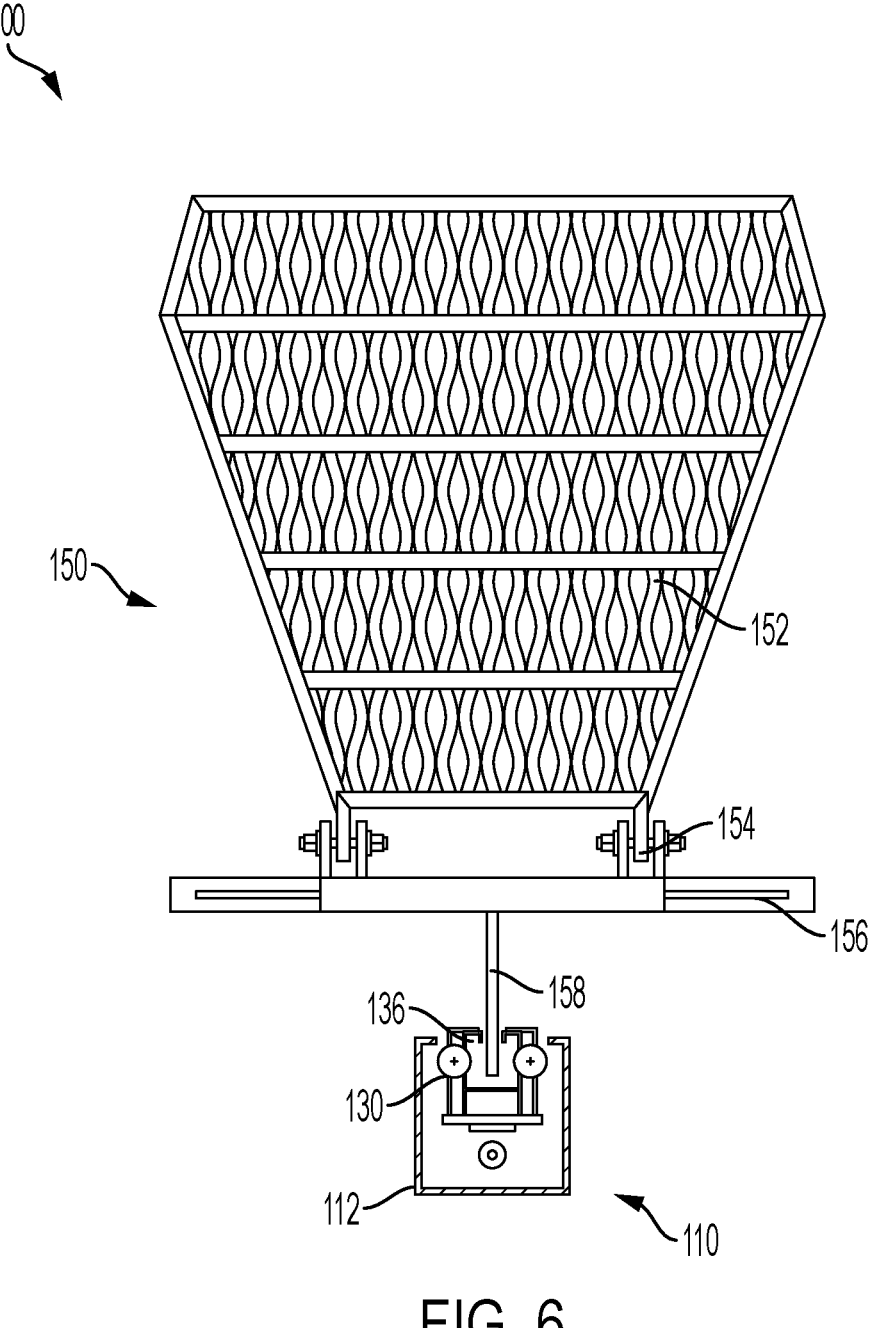
FIG. 6 shows a transverse cross sectional view of the post assembly of the extendable hunting stand of FIG. 1 as taken along line 6-6 in FIG. 2.

Inner post 130 of post assembly 110 may include a lower end 131 opposite an upper end 133 and may be generally linear in configuration. Inner post 130 may be arranged at least partially within outer post 112. Inner post 130 may be movable relative to outer post 112, and outer post 112 may be in a fixed position. Inner post 130 may be arranged along or parallel to a longitudinal axis of outer post 112 and may be movable in a direction of the longitudinal axis. Inner post 130 may be hollow. Inner post 130 may have a diameter that is less than a diameter of outer post 112 so that inner post 130 may fit within outer post 112. Inner post 130 may have the same cross-sectional shape as outer post 112. For example, if outer post 112 has a transverse cross-sectional shape that is rectangular, inner post 130 may similarly have a transverse cross sectional shape that is rectangular. In an aspect, the cross-sectional area of inner post 130 can be smaller than the cross-sectional area of outer post 112. Inner post 130 may include a longitudinal slot 136 (see, e.g., FIG. 4) extending along inner post 130 in a direction from lower end 131 toward upper end 133. As shown in FIG. 6, platform assembly 150 may extend outward from inner post 130 through longitudinal slot 136 such that a portion of platform assembly 150 is arranged within an interior area of inner post 130.

Inner post 130 may be stowed within outer post 112 to provide hunting stand 100 with a compact configuration for storage and transportation. In a stowed position, upper end 133 of inner post 130 may be arranged at or below upper end 113 of outer post 112. In use, post assembly 110 may extend to an extended position in which upper end 133 of inner post 130 extends above upper end 113 of outer post 112 to increase the total height H of hunting stand 100, wherein the total height H may be measured from lower end of motor housing 105 to upper end 133 of inner post 130. In some embodiments, post assembly 110 may have a height of about 11 feet in a stowed position, and may extend to a height of up to about 20 feet in the extended position.

Figure 3:
FIG. 3 shows a transverse cross sectional view of a post assembly of the extendable hunting stand of FIG. 1 as taken along line 3-3 in FIG. 2.
Figure 3:
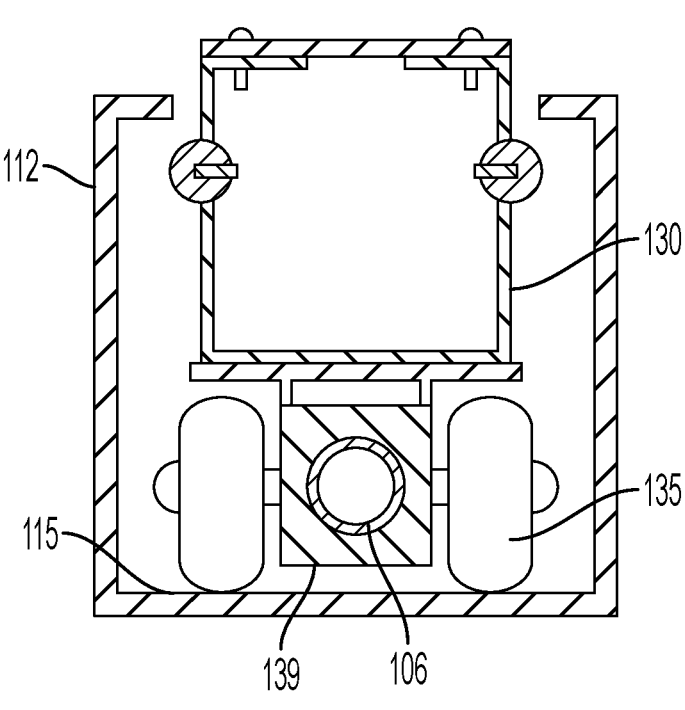

In some embodiments, as shown in FIG. 3, inner post 130 may include one or more wheels 135 or bearings configured to roll along an interior surface 115 of outer post 112, or along a track or rail on interior surface 115, to facilitate movement of inner post 130 relative to outer post 112. Wheels 135 may be arranged on an extension 139 of inner post 130. Extension 139 may be fixed to inner post 130 and may be movably coupled to a threaded rod 106 of hunting stand 100 that controls movement of inner post 130 relative to outer post 112, as discussed in further detail below.

Figure 4:
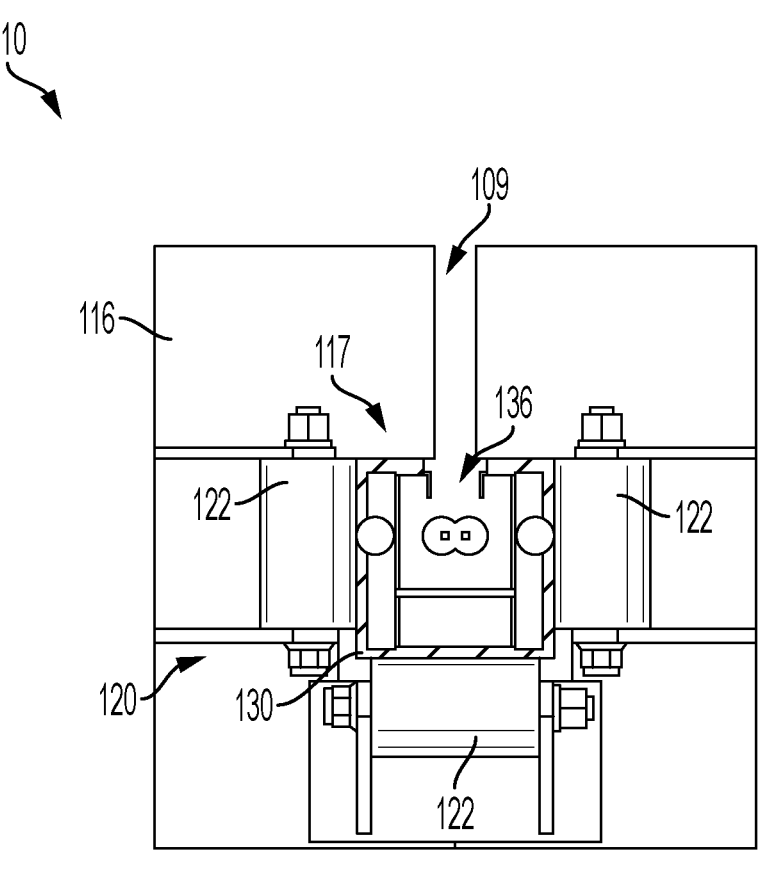
FIG. 4 shows a transverse cross sectional view of a post assembly of the extendable hunting stand of FIG. 1 as taken along line 4-4 in FIG. 2.

In some embodiments, hunting stand 100 may include one or more wheel assemblies, as shown in FIG. 4. While the present application may refer primarily to wheel assemblies having wheels, it is understood that rollers, bearings, and other components that reduce friction and facilitate relative motion may be used. A first wheel assembly 120 may be arranged on upper end of outer post 112. First wheel assembly 120 may include one or more wheels 122 or bearings arranged around opening 117 of upper end 113 of outer post 112, as best shown in FIG. 4. Wheels 122 may be arranged at a perimeter of opening 117, and wheels 122 are configured to roll against an exterior surface of a portion of inner post 130 that extends above upper end 113 of outer post 112 to facilitate movement of inner post 130 relative to outer post 112. Wheels 122 may be mounted on a plate 116 at upper end 113 of outer post 112. Plate 116 may include a slot 109 that aligns with longitudinal slot 136 of inner post 130 so that platform assembly 150 may pass through longitudinal slot 136 and slot 109 of plate 116. In some embodiments, at least two wheels 122 may be arranged on opposing sides of opening 117. In some embodiments, no wheels are arranged on a side of inner post 130 at which longitudinal slot 136 is located so that first wheel assembly 120 does not obstruct movement of platform assembly 150 along inner post 130. In FIG. 4, three wheels 122 are shown, however, in other embodiments fewer or additional wheels 122 may be present.

Figure 5:
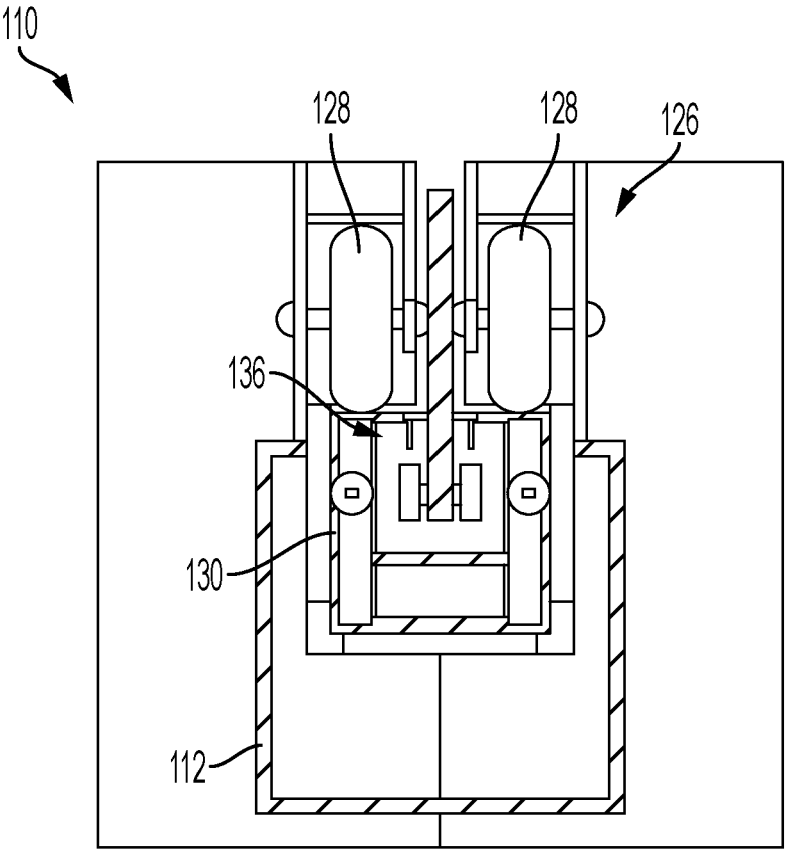
FIG. 5 shows a transverse cross sectional view of the post assembly of the extendable hunting stand of FIG. 1 as taken along line 5-5 in FIG. 2.

In some embodiments, as shown in FIG. 5, a second wheel assembly 126 may be arranged on a side of outer post 112 at upper end 113 of outer post 112. Second wheel assembly 126 may include one or more wheels 128, and may include one or more pairs of wheels 128 configured to roll along an exterior surface of inner post 130. Each pair of wheels 128 may be arranged on opposing sides of longitudinal slot 136 of inner post 130 so that wheels 128 do not obstruct or interfere with movement of platform assembly 150 along inner post 130. Wheels 128 of second wheel assembly 126 may be arranged at different elevations along outer post 112, and may be arranged vertically above one another (see, e.g., FIG. 7). Wheels 128 of second wheel assembly 126 may each be arranged on the same side of outer post 112 so that wheels 128 each contact the same surface of inner post 130. In this way, second wheel assembly 126 supports the side of inner post 130 having longitudinal slot 136. In some embodiments, one or both of first and second wheel assemblies 120, 126 may be present.

Figure 7:
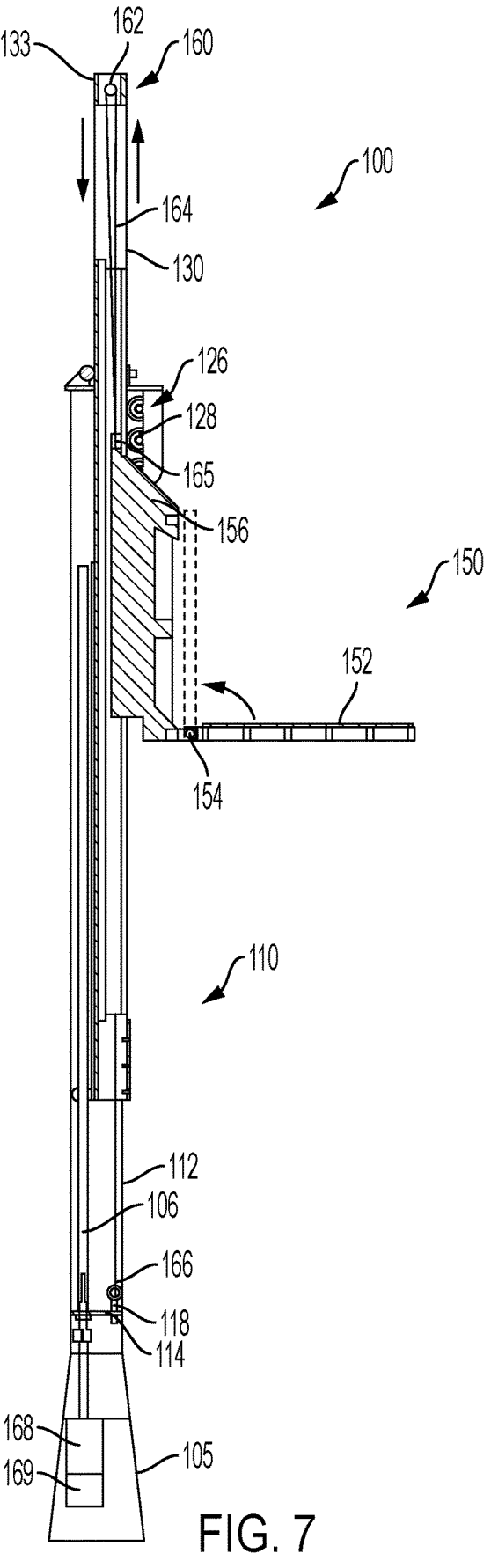
FIG. 7 shows a longitudinal cross sectional view of the extendable hunting stand showing the platform assembly as taken along line 7-7 in FIG. 1.

Platform assembly 150 may be movable with respect to inner post 130, as shown in FIGS. 6-7. Platform base 156 of platform assembly 150 may include an arm 158 that extends through longitudinal slot 136 of inner post 130 so that platform base 156 and platform 152 are arranged exterior to post assembly 110 while a portion of arm 158 extends into an interior of inner post 130. Arm 158 may be connected to a lifting assembly 160 within post assembly 110. In some embodiments, arm 158 may include one or more wheels or bearings for engaging with a surface of inner post 130, or a track or rail, to facilitate movement of platform assembly 150 along inner post 130.

Hunting stand 100 may include a lifting assembly 160 for automatically lifting platform assembly 150 along post assembly 110, as best shown in FIG. 7. Lifting assembly 160 may include a motor 168 for automatically lifting platform assembly 150. In some embodiments, lifting assembly 160 may include a threaded rod 106 along which inner post 130 is movable. Threaded rod 106 may extend along a longitudinal axis of post assembly 110 from lower end 111 of outer post 112 toward an upper end 113 of outer post 112. Inner post 130 may be movably connected to threaded rod 106, such as via an extension 139 of inner post 130 (see, e.g., FIG. 3). As threaded rod 106 rotates, inner post 130 translates linearly along a longitudinal axis of outer post 112. Rotation of threaded rod 106 in a first direction (e.g., clockwise) may cause inner post 130 to telescope out of outer post 112 beyond upper end 113 of outer post 112, and rotation in a second opposing direction (e.g., counter-clockwise) may cause inner post 130 to move toward lower end 111 of outer post 112. Threaded rod 106 may be driven by motor 168 so that extension of inner post 130 from outer post 112 may be carried out automatically. Motor 168 may be arranged in a motor housing 105 at lower end 111 of outer post 112. In some embodiments, motor housing 105 may further include a power source 169, such as a battery or generator, for providing electrical energy to motor 168. In some embodiments, the power source may include a rechargeable battery, such as a lithium-ion battery. However, in some embodiments, motor 168 may be driven by a power source external to hunting stand 100.

As shown in FIG. 7, lifting assembly 160 may further include one or more pulleys 162 arranged inside of inner post 130 at upper end 133 of inner post 130. A cable 164 may be arranged on each pulley 162 with a first end 165 of cable 164 secured to platform assembly 150, such as to arm 158 of platform assembly 150 within inner post 130, and a second end 166 of cable 164 may be secured to lower end 111 of outer post 112, such as to eyebolts 118 arranged on a baseplate 114 of outer post 112. Pulley 162 and cable 164 may be enclosed within post assembly 110. As threaded rod 106 rotates, inner post 130 moves toward and beyond upper end 113 of outer post 112, which increases a distance between pulleys 162 at upper end 133 of inner post 130 and lower end 111 of outer post 112. As cable 164 has a fixed length, increasing the distance between pulley 162 and lower end 111 of outer post 112 by extending inner post 130 out of outer post 112 causes the portion of cable 164 between pulley 162 and arm 158 to decrease in length such that platform assembly 150 moves upward from lower end 131 toward upper end 133 of inner post 130. Thus, as inner post 130 telescopes out of outer post 112, platform assembly 150 is lifted along inner post 130 from a lower end of inner post 130 toward an upper end 133 of inner post 130.

Figure 8:
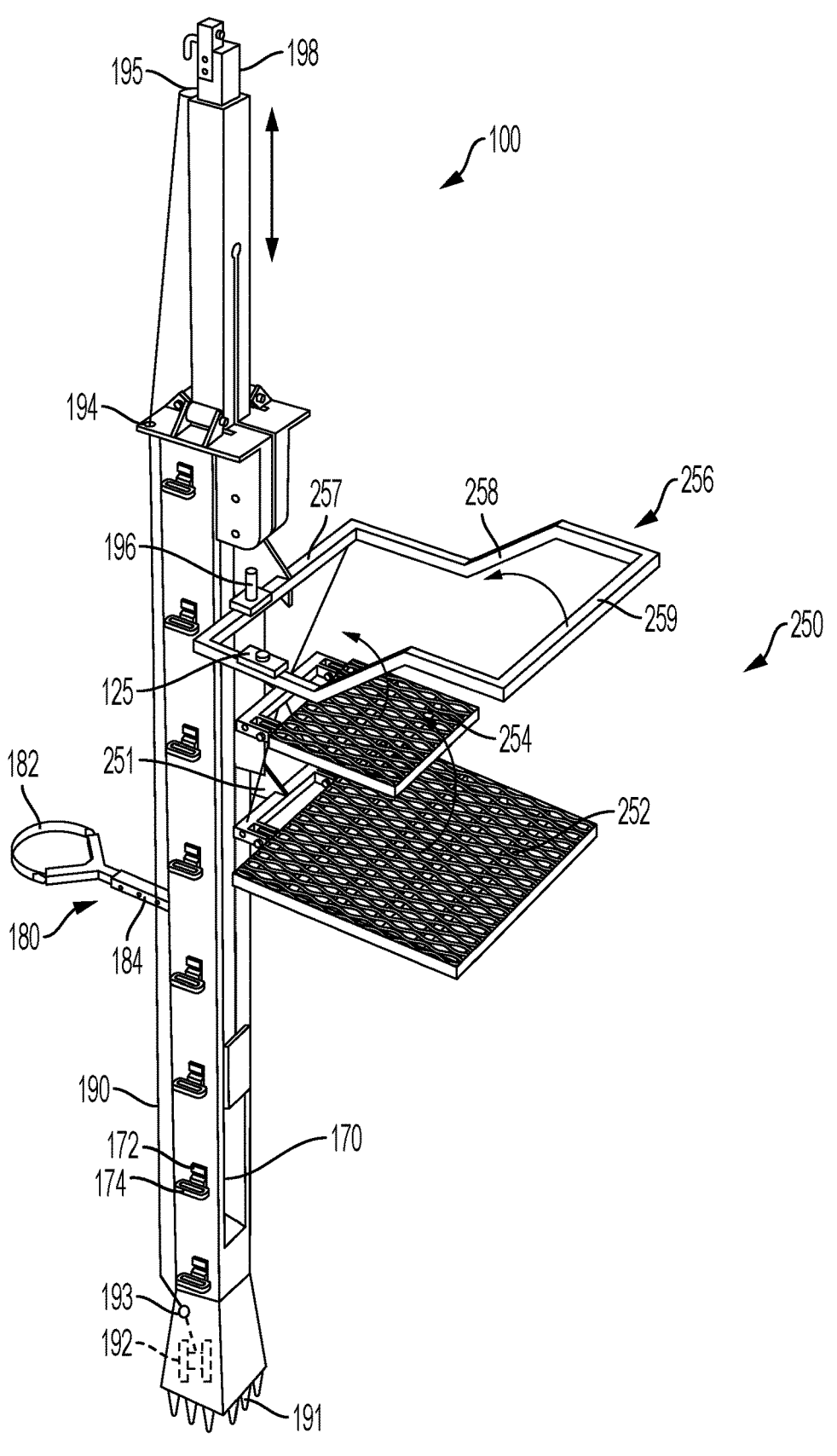
FIG. 8 shows a perspective view of an extendable hunting stand having a platform assembly according to an embodiment.

As best shown in FIG. 8, a control unit 125 may be in communication with motor 168 such that a hunter may operate control unit 125 to cause platform assembly 150 to be automatically raised or lowered. In some embodiments, hunting stand 100 may be automatically adjusted to a set height. Control unit 125 may include a memory configured to store a height setting in order to automatically adjust platform assembly 150 to the stored height setting. For example, a hunter may use control unit 125 to raise platform assembly 150 to a desired height, and may operate control unit 125 to save or store that height. In subsequent uses of hunting stand 100, the hunter may then operate control unit 125 to automatically adjust platform assembly 150 to the stored height setting. Control unit 125 may include one or more buttons, dials, switches, levers, or the like for controlling the motor 168 to cause platform assembly 150 to raise and lower. Control unit 125 may be located at platform assembly 150 so that control unit 125 may be accessed by a hunter in position on platform assembly 150. Control unit 125 may be mounted to platform 152 or platform base 156, among other locations. In some embodiments, control unit 125 may be a remote control that is freely movable and that is in wireless communication with the motor 168.

In some embodiments, hunting stand 100 may include an emergency braking system 196, as shown in FIG. 8. Emergency braking system 196 may be arranged on platform assembly 150 and may help to prevent fall of platform assembly 150, such as if cable 164 snapped or platform assembly 150 disconnected from cable 164. Emergency braking system 196 may include a hand-operated lever, button, switch, or the like that a hunter may operate to prevent movement of platform assembly 150 relative to post assembly 110. In some embodiments, emergency braking system 196 may include brake calipers on one or more of wheels 122, 128, and 135 to prevent motion of wheels. In some embodiments, operation of braking system 196 may cause a spring-loaded pin of platform assembly 150 to engage with a portion of post assembly 110 to lock a position of platform assembly 150 relative to post assembly 110. However, other types of braking systems may be employed to prevent or limit movement of platform assembly 150 as will be understood by one of ordinary skill in the art. As shown in FIG. 8, in some embodiments, hunting stand 100 may include one or more steps 170 on outer post 112. Steps 170 may be spaced along outer post 112 from lower end 111 to upper end 113. Steps 170 may allow the hunter to climb down from platform 152 to the ground in the event platform assembly 150 fails to function properly, such as due to lack of electrical power to motor 168, mechanical failures, or the like. Steps 170 may also be used by a hunter to climb post assembly 110 to reach platform 152 if so desired. Each step 170 may include a mounting plate 172 secured to outer post 112, and a foldable platform 174. Foldable platform 174 may be rotated from a storage position in which platform 174 is parallel to outer post 112 and may be in contact with mounting plate 172, and an extended position in which foldable platform 174 is perpendicular to outer post 112. In the extended position, a hunter may place a foot on foldable platform 174 of step 170 to climb hunting stand 100. In some embodiments, hunting stand 100 may alternatively or additionally include a hand-crank operably connected to a lifting mechanism (described in further detail below) for raising and lowering the platform assembly 150 so that the hunter may operate the hand-crank to manually lower platform assembly 150.

In some embodiments, hunting stand 100 may include a platform assembly 250, as shown in FIG. 8. As described above with respect to platform assembly 150, platform assembly 250 may include a platform 252 rotatably connected to a platform base 251. Platform 252 may rotate from a collapsed position in which platform 252 is generally parallel to post assembly 110, to an extended position in which platform 252 is generally perpendicular to post assembly 110. Platform assembly 250 may further include a seat 254 connected to platform base 251 at a location above platform 252. Seat 254 may be rotatable from a collapsed position in which seat 254 is generally parallel to post assembly 110, to an extended position in which seat 254 is generally perpendicular to post assembly 110. Thus, when platform 252 and seat 254 are in the extended positions, the hunter may sit on seat 254 with his or her feet resting on platform 252. Seat 254 may include a plate or panel, and may include a pad or cushion thereon. Seat 254 may have a smaller surface area than a surface area of platform 252.

In some embodiments, platform assembly 250 may further include a guard rail 256 to help prevent a hunter from falling from platform assembly 250. Guard rail 256 may include a base portion 257 connected to platform base 251 at a location above seat 254 and a pair of arms 258 extending outwardly from base portion 257 at opposing ends of base portion 257. In this way, guard rail 256 may partially surround a hunter positioned on platform 252 (or seat 254). Thus, guard rail 256 may have a generally C-shaped configuration. In some embodiments, arms 258 may also be connected to one another by a front rail 259 such that guard rail 256 forms a ring that fully surrounds hunter. Front rail 259 may connect the ends of arms 258 opposite base portion 257. Base portion 257 of guard rail 256 may be pivotally connected to platform base 251 such that guard rail 256 is movable between a collapsed position and an extended position. In the collapsed position, guard rail 256 may be arranged generally parallel to post assembly 110 and in the extended position guard rail 256 may be generally perpendicular to post assembly 110. Guard rail 256 may be rotated approximately 90 degrees from the collapsed position to the extended position. In another aspect, platform 252, seat 254 and/or guard rail 256 may be detachable from platform base 251.

In some embodiments, hunting stand 100 may include a safety line 190, as shown for example in FIG. 8. Safety line 190 may extend from a lower end 111 of outer post 112 to an upper end 133 of inner post 130. In this way, safety line 190 spans the height of hunting stand 100 for access by the hunter regardless of the elevation at which the platform assembly 150 is positioned. Safety line 190 may include a belt, cable, rope, or the like. A hunter may wear a harness and may secure the harness to safety line 190 such as by a knot or fastener, such as a clip or carabiner. Should the hunter fall, the hunter is prevented from falling to the ground due to securement of the hunter's harness to the safety line 190.

In some embodiments, safety line 190 may include a supply unit 192 arranged at lower end of post assembly 110, and may be arranged in motor housing 105. Supply unit 192 may include a spool on which safety line 190 is wound. Supply unit 192 may include a biasing mechanism for biasing safety line 190 in a wound position on spool. When safety line 190 is unwound from spool, safety line 190 is maintained under tension by biasing mechanism, and safety line 190 may automatically retract into a wound position on spool when not in use. Safety line 190 may be extended from supply unit 192 through a base opening 193 to reach an exterior of motor housing 105. Safety line 190 extends along the height of outer post 112. Safety line 190 may extend along a side of post assembly 110 so as to avoid interference with movement of platform assembly 150. At the upper end 113 of outer post 112, safety line 190 may pass through a plate opening 194 and safety line 190 extend to an anchor point 195. Safety line 190 is removably securable to anchor point 195 to prevent safety line 190 from retracting into the supply unit 192. Anchor point 195 may be located on a trailer hitch 198 or connector disposed on the upper end 133 of inner post 130. Safety line 190 may include a fastener, such as a clip, carabiner, or the like, at its terminal end that is configured to removably secure safety line 190 to anchor point 195.

In order to install hunting stand 100, lower end 111 of outer post 112 may be placed at ground level adjacent a tree or other support structure in an upright orientation. In some embodiments, lower end 111 of outer post 112 may include cleats 191, as shown for example in FIG. 8 to help to secure lower end 111 of outer post 112 to the ground to prevent slipping or sliding of post assembly 110 on the ground. In some embodiments, a lower end 111 of outer post 112 may be at least partially buried. In such embodiments, a hunter may form a hole in the ground, such as by digging or by use of an auger, and inserting lower end 111 into hole and backfilling the hole with a filler material, such as soil. Hunting stand 100 is installed such that post assembly 110 is arranged in an upright orientation. Post assembly 110 may be arranged vertically and perpendicular to a horizontal plane, e.g., at a 90 degree angle to the horizontal plane. However, in some embodiments post assembly 110 may be installed at a slight angle, such as at an angle of 85 degrees or 80 degrees, relative to a horizontal plane.

As shown in FIG. 8, hunting stand 100 may include one or more securement devices 180 for securing post assembly 110 to a tree or other support structure. Securement device 180 may include a strap 182 configured to be looped around a tree or other support structure. Strap 182 may be arranged on a support 184 connected to outer post 112. Support 184 may be rotatably connected to outer post 112, such as by a hinge, so securement device 180 may rotate from a collapsed position in which support 184 is generally parallel to outer post 112 and may be in contact with outer post 112, to an extended position in which securement device 180 extends away from outer post 112 at an angle. In some embodiments, support 184 may also be adjustably connected to outer post 112 so that support 184 may extend outward from outer post 112 to a desired length. Support 184 may be extendable and retractable so as to span a distance between post assembly 110 and the tree or support structure to facilitate securement of the strap 182 around the tree. In another aspect, securement device 180 can be fixedly attached to a tree trunk, such as by screws or nails.

Once hunting stand is installed at the desired location, platform 152 may be unfolded from the collapsed position to the extended position. Platform 152 may be arranged at or near ground level, e.g., within one foot of ground level, so that the hunter may easily move onto platform 152. With the hunter on platform 152, lifting assembly 160 may be operated, such as via a control unit 125, to raise platform assembly 150 from ground level to a desired elevated position. Lifting assembly 160 raises platform 152 automatically, such that the hunter does not have to move or lift the platform 152, operate a crank, or perform other manual task to raise platform 152. Specifically, motor 168 may rotate a threaded rod 106 to cause inner post 130 to translate linearly with respect to stationary outer post 112 and extend above upper end 113 of outer post 112. As post assembly 110 extends in height, a portion of cable 164 spanning the distance from lower end 111 of outer post 112 and pulley 162 at upper end 133 of inner post 130 increases, causing the portion of cable 164 between pulley 162 and platform assembly 150 to decrease, thus raising platform assembly 150 along post assembly 110. Hunter may select the precise elevation above the ground at which the platform 152 is arranged. In this way, hunting stand 100 allows a hunter to obtain an elevated vantage point for hunting without having to climb a tree or mount the hunting stand at an elevated position in the tree.

Hunting stand 100 may be composed of a lightweight metal, such as steel, aluminum or an alloy, such as an alloy of aluminum and copper, manganese, magnesium, chromium, zinc, and/or silicon. For example, one or more of outer post 112, inner post 130, and platform assembly 150, 250 may be formed from aluminum or an aluminum alloy. In this way, the hunting stand 100 may be strong and durable while also being relatively lightweight.

In some embodiments, hunting stand 100 may include a trailer hitch 198 or connector, as shown in FIG. 8. Trailer hitch 198 may be arranged at an upper end 133 of inner post 130. With hunting stand 100 in a collapsed configuration, with inner post 130 arranged at least partially within outer post 112, trailer hitch 198 may be secured to a trailer hitch of a towing vehicle, such as a pick-up truck. In this way, hunting stand 100 can be positioned on a wheeled cart 300 or trailer (see, e.g., FIG. 11) and trailer hitch 198 of hunting stand 100 may be removably secured to the trailer hitch of a vehicle in order to allow hunting stand 100 to be easily transported by the hunter to a desired hunting location.

In some embodiments, hunting stand 100 may be camouflaged and may include a pattern or coloring to help hunting stand 100 blend into the surroundings, such that hunting stand 100 is less noticeable to animals. For example, hunting stand 100 may include a camouflage pattern on post assembly 110 and platform assembly 150, 250, and may include green and brown colors.

Figure 9:
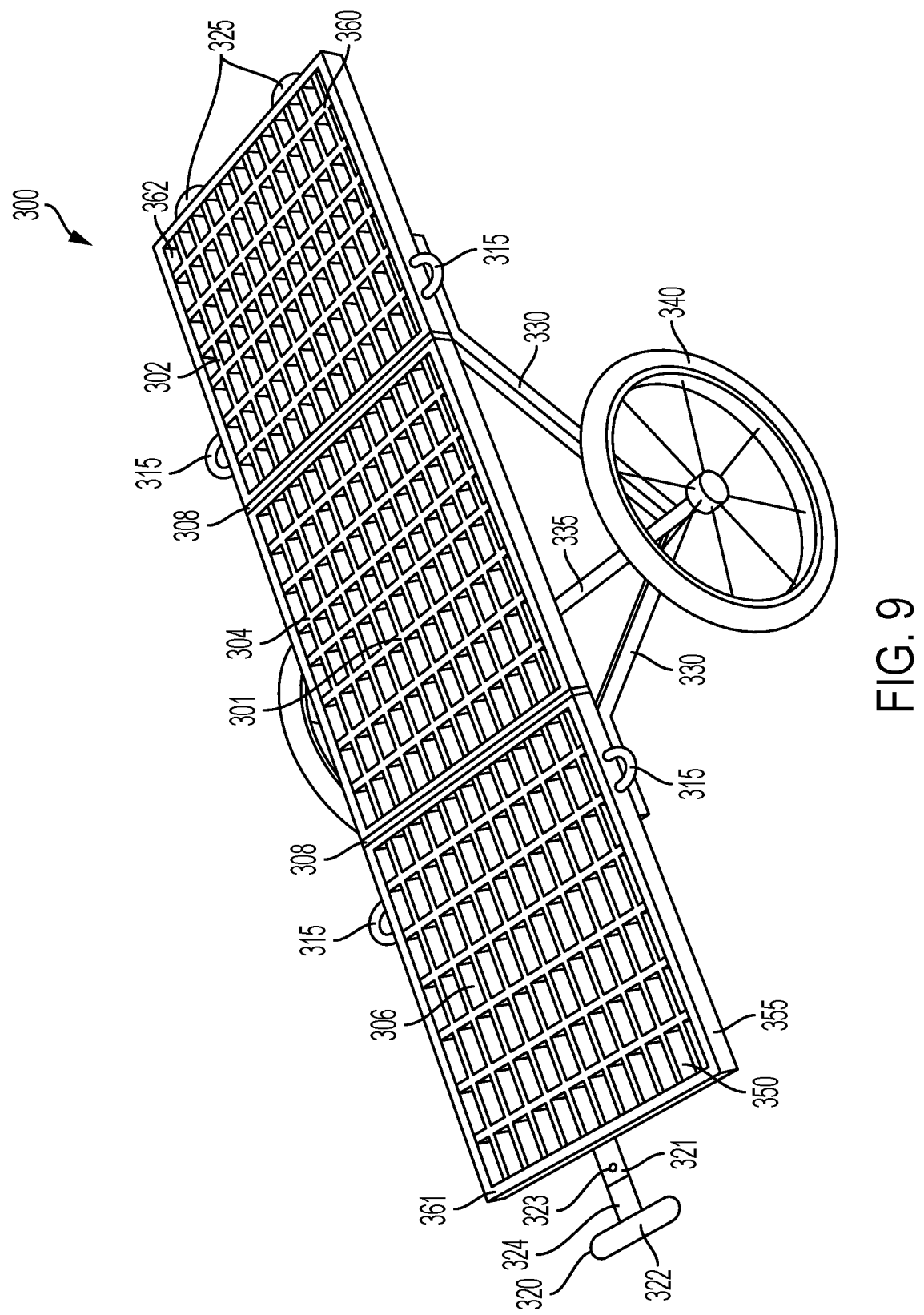
FIG. 9 shows a perspective view of a wheeled cart for transporting a hunting stand according to an embodiment.
Figure 10:
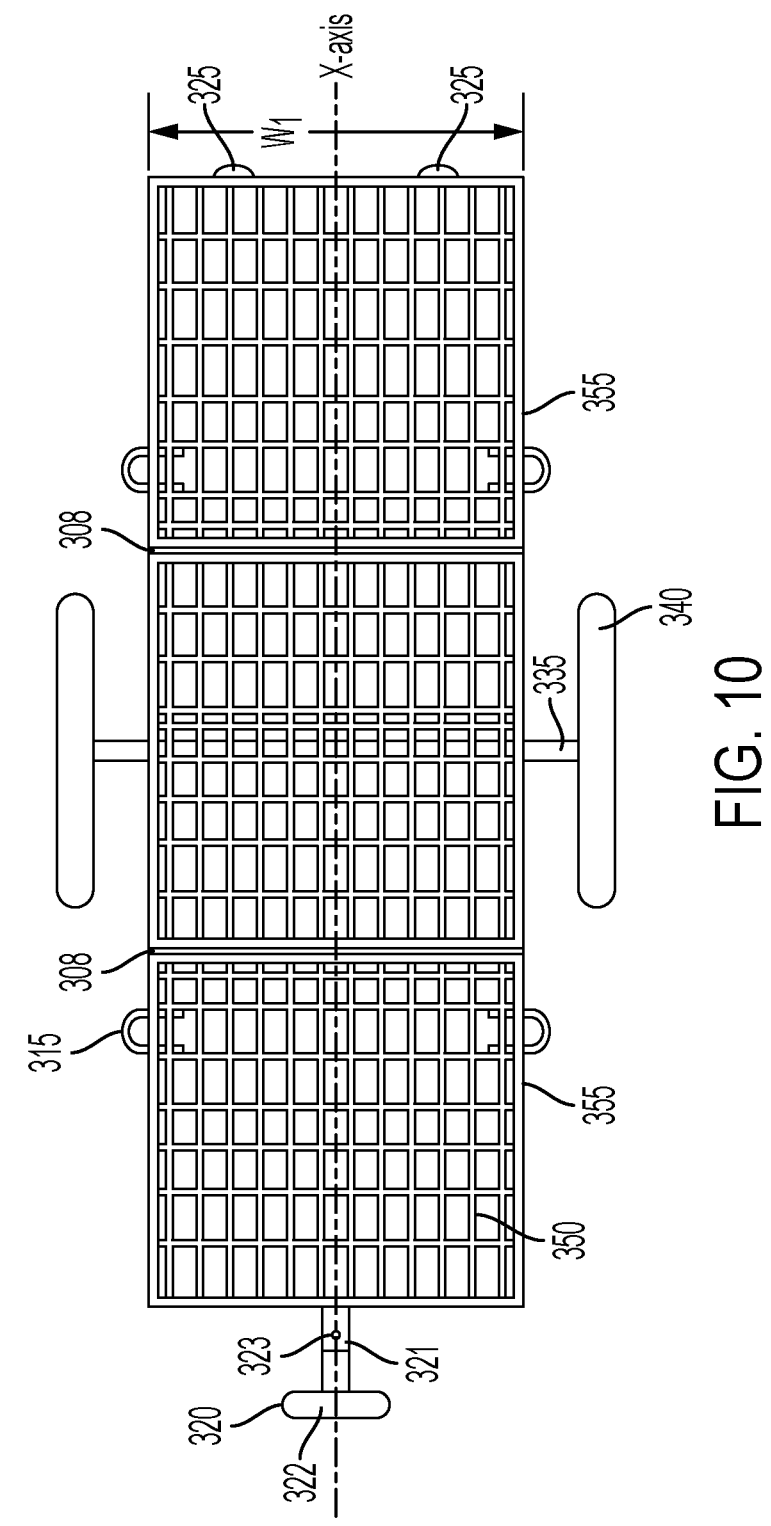
FIG. 10 shows a top-down view of the wheeled cart of FIG. 9.
Figure 11:
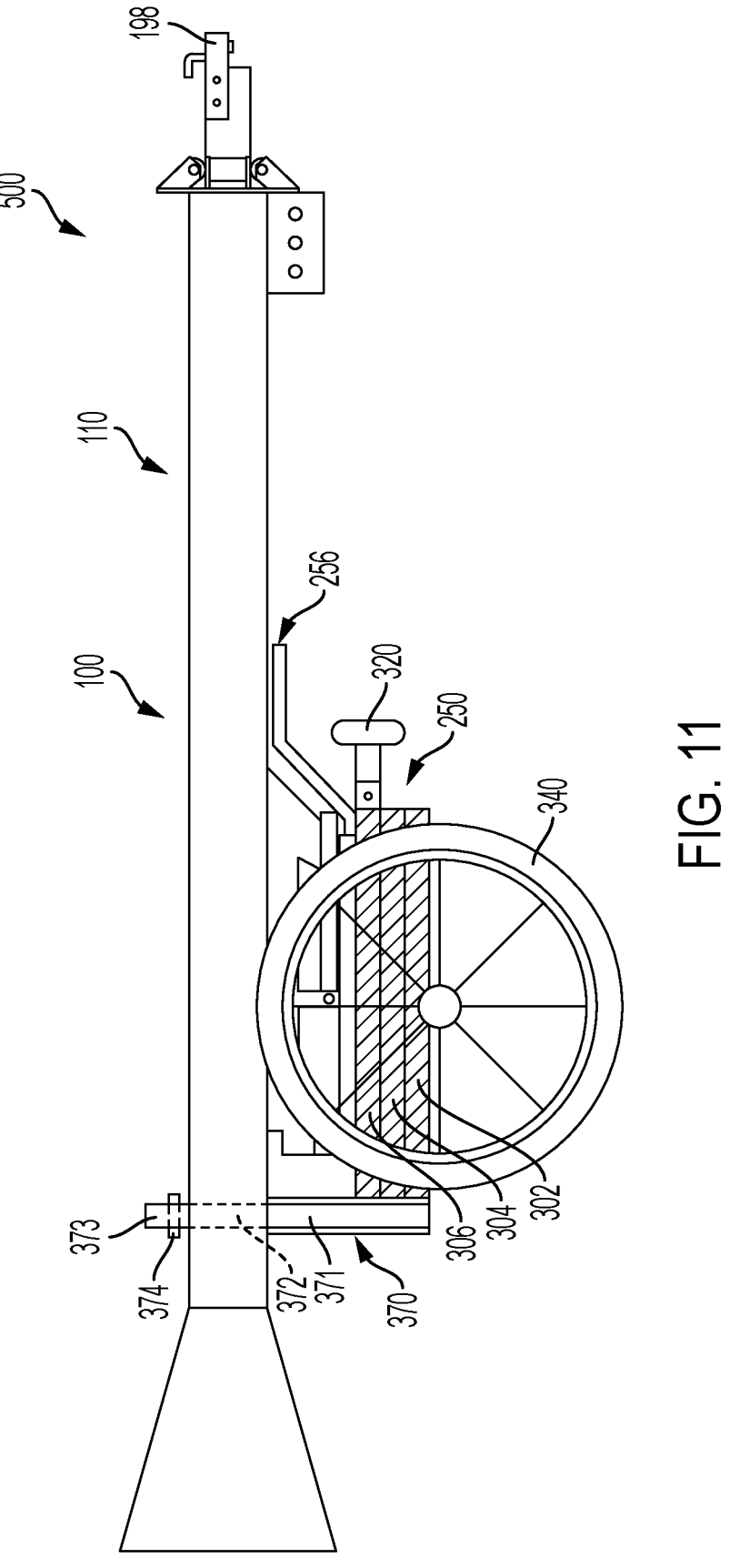
FIG. 11 shows a side view of the wheeled cart of FIG. 9 as used to transport a hunting stand according to an embodiment.

A wheeled cart 300 may be used to facilitate transport of a hunting stand, as shown for example in FIGS. 9-11. Wheeled cart 300 may include a base member 301 for supporting a hunting stand, game, or other cargo, and one or more wheels 340 connected to base member 301. Base member 301 may be a single unitary component or may be composed of a plurality of subcomponents connected to one another to allow base member 301 to collapse for storage and transportation.

In some embodiments, base member 301 may be substantially planar. Base member 301 may include a solid panel, or alternatively base member 301 may include a grid design as shown in FIG. 9. In such embodiments, base member 301 may include panel grating 350, which creates the grid design and reduces the overall weight of wheeled cart 300 while maintaining the necessary strength and durability to enable wheeled cart 300 to effectively tow heavy loads of cargo or game. A panel frame 355 may extend around a perimeter of panel grating 350. Base member 301 is not limited to the designs shown in the figures and may include various other configurations for exterior surface 360, such that it can support a cargo load. FIGS. 9-11 show base member 301 having a rectangular shape, however, in some embodiments, base member 301 may be round, circular, or polygonal.

In some embodiments, base member 301 may include three panels 302, 304, 306. Panels 302, 304, 306 may be arranged in a horizontal orientation along a longitudinal axis X, as shown in FIG. 10. First panel 302 and third panel 306 may be arranged on opposing sides of a central, second panel 304. First and third panels 302, 306 may be pivotally attached to second panel 304 so as to move from a collapsed position for storage to an extended position for carrying cargo. In some embodiments, panels 302, 304, and 306 are pivotally connected via hinge members 308. Hinge members 308 may span the entire width $w_1$ of the base member 301 or hinge members 308 may span only a portion of the width $w_1$ of the base member 301. In the embodiment shown in FIGS. 9-11, when collapsing wheeled cart 300, first panel 302 may fold onto second panel 304, and third panel 306 may fold onto first panel 302 so that panels are stacked on top of one another. In some embodiments, third panel 306 may include an additional link or a double-hinge to allow the third panel 306 to lay flat on the first panel 302.

In some embodiments, first and third panels 302, 306 may be nested within the second panel 304 to allow for first and third panels 302, 306 to telescopically extend from the second panel 304 in opposing directions.

Base member 301 may include securement members 315 to allow a user to secure cargo, game, or hunting stand 100 to an exterior surface 360 of base member 301. Securement members 315 may be permanently fastened to panel frame 355 or may be removably secured such as through the use of a spring-loaded fastener for quick detachment and repositioning of securement member 315 to panel frame 355. FIG. 10 shows securement members 315 disposed on opposing sides 361, 362 of base member 301. However, securement members 315 can be arranged in various configurations along panel frame 355 or on exterior surface 360. Securement members 315 can include U-hooks, or slots to accommodate straps, rope, bungee cords, or any other similar fastener which may be used to secure cargo, game, or hunting stand 100. In another embodiment, securement members 315 may include a ratcheting system such that additional external fasteners are not required to secure a load on wheeled cart 300.

In some embodiments, base member 301 may include a towing handle 320 disposed at first end 361 of base member 301, such as to third panel 306. Towing handle 320 may be welded to panel frame 355 or in another embodiment may be removably attached to panel frame 355. Towing handle 320 may include a shaft member 321 extending from panel frame 355 and a handle 322 configured to be grasped in a hand of the user. Further, shaft member 321 may include multiple shafts 324 that are telescopically arranged to allow towing handle 320 to extend and retract. In some embodiments, a length of shaft member 321 may be adjusted and secured through a fastener 323. Fastener 323 may be a pin, bolt, or slug, among others.

As shown in FIG. 10, base member 301 may include one or more lights 325 arranged on panel frame 355. Lights 325 may be disposed at a second end 362 of base member 301 such that wheeled cart 300 can be more easily seen while towing in the dark. In some embodiments, lights 325 may be disposed along one or more sides of base member 301 to provide illumination while towing. In some embodiments, lights 325 may be disposed on first end 361 of panel frame 355 to act as headlights for wheeled cart 300 during towing. In some embodiments, lights 325 may be powered by a power source 169 of hunting stand 100.

Wheeled cart 300 may include wheels 340 to facilitate transportation. Wheels 340 may be connected to an axle 335, as best shown in FIG. 10. Axle 335 may be connected to support struts 330 which extend from base member 301 and secure axle 335 to base member 301. Axle 335 is arranged under a center of base member 301 and extends transversely to the longitudinal X-axis. FIGS. 9-11 show axle 335 having a width greater than a width $w_1$ of base member 301. As wheels are arranged outside of base member 301, rather than beneath base member 301, wheeled cart 300 may have large sized wheels 340, without increasing the elevation of base member 301 off of the ground. Larger wheels 340 allow for greater traction and stability while towing, and the configuration of wheels 340 still allow for easy loading of wheeled cart 300 due to its lower elevation. However, in another embodiment, wheels 340 may be disposed directly below base member 301.

Wheeled cart 300 may include one or more support struts 330 connecting wheels 340 or axle 335 to base member 301. In FIG. 9, wheeled cart 300 includes four support struts 330 (two struts per side). However, in some embodiments, wheeled cart 300 may include fewer or additional support struts 330 for fastening axle 335 and wheels 340 to base member 301. In some embodiments, support struts 330 may include shock absorbers to help stabilize the load being towed on wheeled cart 300. Further, in another embodiment, support struts 330 may include hydraulics to raise, lower, or angle base member 301 to allow for easier loading of the cargo, game, or hunting stand 100.

Wheeled cart 300 may include a post connector assembly 370 to secure hunting stand 100 to wheeled cart 300. As shown in FIG. 11, hunting stand 100 may be arranged on wheeled cart 300 along a longitudinal axis X of wheeled cart 300. Post connector assembly 370 of wheeled cart 300 may include a rod 371 and a fastener 374. Rod 371 may be secured to wheeled cart 300, and a portion 372 of rod 371 may be inserted through post assembly 110, such as through an aperture of post assembly 110 configured to receive rod 371. An upper end of rod 371 may include a slot or aperture 373 such that fastener 374 may be received through aperture 373 to prevent post assembly 110 of hunting stand 100 from disconnecting from wheeled cart 300. However, in other embodiments, rod 371 may extend partially within post assembly 110 and may contain spring-loaded pins to secure rod 371 within post assembly 110. Post connector assembly 370 may include two rods 371 on opposing sides of base member 301 and two fasteners 374. However, in another aspect, the post connector assembly 370 may have fewer or additional rods and fasteners. Further, post connector assembly 370 may have additional rods or other securement devices that extend around the exterior of post assembly 110 of hunting stand 100 to secure hunting stand 100 to wheeled cart 300, such as straps, cables, ropes, and the like. A hunting stand transportation system 500 for towing the hunting stand 100 on wheeled cart is shown, for example, in FIG. 11. Hunting stand 100 may be arranged in the stowed and collapsed position with upper end 133 of inner post 130 arranged at or below upper end 113 of outer post 112. Further, platform assembly 250, including platform 252, seat 254, and guard rail 256, may be folded into a collapsed position such that each is generally parallel to post assembly 110. Additionally, wheeled cart 300 may be in the collapsed configuration wherein panels 302, 304, and 308 are folded onto one another.

Once both hunting stand 100 and wheeled cart 300 are collapsed, hunting stand 100, with platform assembly 250 facing towards wheeled cart 300, may be placed onto exterior surface 360 of base member 301. Platform 252, seat 254, and guard rail 256 of hunting stand 100 may be positioned on panels 302, 304, 306. Further, hunting stand 100 may be positioned on wheeled cart 300 such that post connector assembly 370 secures hunting stand 100 to wheeled cart 300. Once aligned, rod 371 of post connector assembly 370 may extend from panel 302 through post assembly 110. A fastener 374 may secure rod 371 in-place to prevent post connector assembly 370 from disconnecting during transportation. In some embodiments, wheeled cart 300 may be attached to hunting stand 100 while hunting stand 100 is in an upright orientation. This can be achieved by a hunter collapsing wheeled cart 300 and positioning wheeled cart 300 against hunting stand 100 such that rod 371 of post connector assembly 370 can secure them together. Post connector assembly 370 may have a compact configuration to ensure proper securement of hunting stand 100 to wheeled cart 300 with minimal additional components and weight.

Once hunting stand 100 is secured to wheeled cart 300, trailer hitch 198 of hunting stand 100 may be removably secured to a trailer hitch or connector of a towing vehicle in order to allow hunting stand 100 to be easily transported by the hunter to a desired hunting location. In some embodiments, hunting stand 100 and wheeled cart 300 are configured such that when secured together, the height of trailer hitch 198 may be approximately 12 to 30 inches above the ground. The elevation of trailer hitch 198 may allow hunting stand 100 to remain parallel to the ground once during towing. This may help to ensure that the hunting stand 100 and any additional cargo will remain on wheeled cart 300, without falling off during transportation.

Wheeled cart 300 may be composed of a lightweight metal, such as steel, aluminum or an alloy as discussed above with respect to hunting stand 100. In this way, the wheeled cart 300 may be strong and durable while also being lightweight.

In another aspect, hunting stand 100 can include integrated wheels that are directly attached to the outer post 112.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. An extendable hunting stand, comprising:
a post assembly comprising a plurality of posts, wherein the plurality of posts are telescopic such that a height of the post assembly is adjustable in a longitudinal direction, wherein an inner post of the plurality of posts comprises an extension with one or more wheels arranged thereon, and wherein the one or more wheels are configured to move along an interior surface of an outer post of the plurality of posts;

a plurality of steps arranged on a post of the post assembly, wherein each of the plurality of steps comprises a mounting plate secured to the outer post, and a foldable platform;

a platform assembly, comprising:

a platform base movably coupled to the post assembly; and a platform connected to the platform base and configured to support a hunter;

a lifting assembly configured to automatically move the platform assembly along a longitudinal axis of the post assembly, wherein the lifting assembly comprises a motor housing comprising an electric motor and a battery; and a securement device configured to secure the post assembly to a tree, the securement device comprising:

a support extending outward from the outer post, wherein a length of the support is adjustable; and a strap coupled to the support and configured to wrap around the tree.

2. The hunting stand of claim 1, wherein the platform is pivotably connected to the platform base, such that the platform is configured to rotate from a collapsed position in which the platform is parallel to the outer post, to an extended position in which the platform is perpendicular to the outer post.

3. The hunting stand of claim 1, wherein the lifting assembly comprises a pulley and a cable arranged on the pulley and connected at a first end to the platform assembly and at a second end to a lower end of the post assembly.

4. The hunting stand of claim 1, wherein the platform assembly is movably coupled to the inner post of the post assembly between an upper end and an opposing lower end of the inner post.

5. The hunting stand of claim 1, wherein the motor housing is disposed at a lower end of the outer post.

6. The hunting stand of claim 1, further comprising a wheel assembly arranged at an upper end of the outer post, wherein the wheel assembly comprises one or more wheels configured to contact the inner post.

7. The hunting stand of claim 6, wherein the upper end of the outer post comprises an opening configured to allow the inner post to extend through the opening and above the upper end of the outer post, wherein the one or more wheels of the wheel assembly are arranged around the opening at the upper end of the outer post, and wherein the one or more wheels of the wheel assembly are configured to contact a portion of the inner post extending through the opening.

8. The hunting stand of claim 6, wherein the one or more wheels of the wheel assembly are configured to contact a portion of the inner post within the outer post.

9. The hunting stand of claim 1, wherein the one or more wheels of the extension comprises first and second wheels, wherein the first and second wheels are arranged on opposing sides of the extension.

10. The hunting stand of claim 1, wherein the inner post is movably connected to a threaded rod via the extension.

11. The hunting stand of claim 1, wherein the inner post comprises a longitudinal slot extending between a lower end and an upper end of the inner post, and wherein a platform arm connected to the platform base extends through the longitudinal slot.

12. The hunting stand of claim 1, wherein the outer post comprises a longitudinal opening extending between a lower end and an upper end of the outer post.

13. The hunting stand of claim 1, wherein the lifting assembly further comprises a pulley and a cable, and wherein the cable is enclosed within the post assembly.

14. The hunting stand of claim 1, further comprising a plurality of cleats extending from a lower end of the outer post.

15. The hunting stand of claim 1, further comprising a hitch arranged at an upper end of the inner post, the hitch being configured to secure the hunting stand to a vehicle for towing.

\* \* \* \* \*